US012692357B2

(12) United States Patent
Mueller-Cristadoro et al.

(10) Patent No.: US 12,692,357 B2
(45) Date of Patent: Jul. 28, 2026

(54) PROCESS FOR PREPARING COATED SHAPED BODIES AND THEIR USE

(71) Applicant: BASF SE, Ludwigshafen am Rhein (DE)

(72) Inventors: Anna Maria Mueller-Cristadoro, Lemfoerde (DE); Frank Prissok, Lemfoerde (DE); Bernd Reck, Ludwigshafen (DE); Michael Harms, Lemfoerde (DE); Frank Thielbeer, Lemfoerde (DE); Elmar Poeselt, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 246 days.

(21) Appl. No.: 18/556,306

(22) PCT Filed: Apr. 14, 2022

(86) PCT No.: PCT/EP2022/060048

§ 371 (c)(1),
(2) Date: Oct. 19, 2023

(87) PCT Pub. No.: WO2022/223438

PCT Pub. Date: Oct. 27, 2022

(65) Prior Publication Data

US 2024/0209173 A1 Jun. 27, 2024

(30) Foreign Application Priority Data

Apr. 22, 2021 (EP) .................................... 21169887

(51) Int. Cl.

| | |
|---|---|
| ***C08J 9/224*** | (2006.01) |
| ***B29C 67/20*** | (2006.01) |
| ***B29C 67/24*** | (2006.01) |
| ***B29C 71/00*** | (2006.01) |
| ***B29C 71/02*** | (2006.01) |
| ***B29K 21/00*** | (2006.01) |
| ***B29K 75/00*** | (2006.01) |
| ***B29K 105/00*** | (2006.01) |
| ***B29L 7/00*** | (2006.01) |
| ***C08J 9/18*** | (2006.01) |
| ***C08J 9/236*** | (2006.01) |

(52) U.S. Cl.

CPC ............... *C08J 9/224* (2013.01); *B29C 67/20* (2013.01); *B29C 67/24* (2013.01); *B29C 71/0009* (2013.01); *B29C 71/02* (2013.01); *C08J 9/18* (2013.01); *C08J 9/236* (2013.01); *B29K 2021/003* (2013.01); *B29K 2075/00* (2013.01); *B29K 2105/251* (2013.01); *B29L 2007/002* (2013.01); *C08J 2375/08* (2013.01); *C08J 2409/06* (2013.01); *C08J 2433/04* (2013.01); *C08J 2439/06* (2013.01); *C08J 2475/04* (2013.01)

(58) Field of Classification Search

CPC ..... B29C 67/20; B29C 67/24; B29C 71/0009; B29C 71/02; B29C 44/206; B29C 44/3461; B29C 44/445; B29C 44/54; C08J 9/18; C08J 9/236

See application file for complete search history.

(56) References Cited

U.S. PATENT DOCUMENTS

| | | | |
|---|---|---|---|
| 3,479,310 | A | 11/1969 | Dieterich et al. |
| 3,905,929 | A | 9/1975 | Noll |
| 3,920,598 | A | 11/1975 | Reiff et al. |
| 4,192,937 | A | 3/1980 | Noll et al. |
| 4,269,748 | A | 5/1981 | Nachtkamp et al. |
| 4,292,226 | A | 9/1981 | Wenzel et al. |
| 4,983,662 | A | 1/1991 | Overbeek et al. |
| 5,135,963 | A | 8/1992 | Haeberle et al. |

(Continued)

FOREIGN PATENT DOCUMENTS

| | | |
|---|---|---|
| CA | 1 129 128 A | 8/1982 |
| DE | 14 95 745 A1 | 6/1969 |

(Continued)

OTHER PUBLICATIONS

A.M. van Herk, "Chemistry and Technology of Emulsion Polymerization Emulsion Polymerization", Second edition, Institute of Chemical and Engineering Sciences, Wiley, 2013, 19 pages.
International Preliminary Report on Patentability for PCT Patent Application No. PCT/EP2022/060048, Issued on Jul. 14, 2023, 8 pages.
International Search Report received for PCT Application No. PCT/EP2022/060048, mailed on Aug. 26, 2022, 3 pages.

(Continued)

*Primary Examiner* — Stella K Yi
(74) *Attorney, Agent, or Firm* — Grüneberg Global IP, PLLC

(57) ABSTRACT

A process for coating particles of an expanded thermoplastic elastomer involves a1) bringing the particles into contact with a water-based binder, resulting in at least partly coated particles, and a2) drying the coated particles. A process for the preparation of a shaped body involves b) coating the particles of the expanded thermoplastic elastomer, wherein before a2) the particles are brought into the shape of the shaped body, or wherein after a2) the particles are brought into the shape of the shaped body and contacted with a solvent, preferably a water-based solvent, or by subjecting the particles to heat. A shaped body is obtainable by such processes. A water-based binder is useful for the preparation of a shaped body, wherein the shaped body is formed by particles of an expanded thermoplastic elastomer and wherein the particles are at least partly coated with the water-based binder.

15 Claims, No Drawings

(56) References Cited

U.S. PATENT DOCUMENTS

| | | | |
|---|---|---|---|
| 5,990,245 | A | 11/1999 | Esselborn et al. |
| 5,994,457 | A | 11/1999 | Stanger et al. |
| 6,096,858 | A | 8/2000 | Dobbelaar et al. |
| 6,365,709 | B1 | 4/2002 | Heibel et al. |
| 6,433,132 | B1 | 8/2002 | Wood et al. |
| 6,444,760 | B1 | 9/2002 | Rupaner et al. |
| 6,462,138 | B1 | 10/2002 | Rupaner et al. |
| 10,005,218 | B2 | 6/2018 | Rudolph et al. |
| 10,501,596 | B2 | 12/2019 | Prissok et al. |
| 11,292,887 | B2 | 4/2022 | Prissok et al. |
| 2005/0161316 | A1 | 7/2005 | Hubinger et al. |
| 2012/0021213 | A1 | 1/2012 | Hartz et al. |
| 2018/0345575 | A1* | 12/2018 | Constantinou ........... C08J 9/122 |
| 2018/0345576 | A1 | 12/2018 | Constantinou et al. |

FOREIGN PATENT DOCUMENTS

| | | | |
|---|---|---|---|
| DE | 19 54 090 | A1 | 5/1971 |
| DE | 20 34 479 | A1 | 1/1972 |
| DE | 39 11 827 | A1 | 10/1990 |
| DE | 196 24 299 | A1 | 1/1997 |
| DE | 196 21 027 | A1 | 11/1997 |
| DE | 197 41 184 | A1 | 3/1999 |
| DE | 197 41 187 | A1 | 3/1999 |
| DE | 198 05 122 | A1 | 4/1999 |
| DE | 198 28 183 | A1 | 12/1999 |
| DE | 198 39 199 | A1 | 3/2000 |
| DE | 198 40 586 | A1 | 3/2000 |
| DE | 198 47 115 | C1 | 5/2000 |
| EP | 0 622 378 | A1 | 11/1994 |
| EP | 0 771 328 | A1 | 12/1995 |
| EP | 3 569 647 | A1 | 11/2019 |
| EP | 3 608 344 | A1 | 2/2020 |
| GB | 1 329 565 | A | 9/1973 |
| GB | 1 339 357 | A | 12/1973 |
| WO | 95/33775 | A1 | 12/1995 |
| WO | 2007/082838 | A1 | 7/2007 |
| WO | 2008/087078 | A1 | 7/2008 |
| WO | 2017/133935 | A1 | 8/2017 |
| WO | 2018/082984 | A1 | 5/2018 |

OTHER PUBLICATIONS

Mehravar et al., "Importance of film morphology on the performance of thermo- responsive waterborne pressure sensitive adhesives", European Polymer Journal, vol. 98, Jan. 2018, pp. 63-71.

Taylor et al., "Functional Latex and Thermoset Latex Films", JCT Research, vol. 1, No. 3, Jul. 2004, pp. 163-190.

Tillet et al., "Chemical reactions of polymer crosslinking and post-crosslinking at room and medium temperature", Progress in Polymer Science, vol. 36, Sep. 21, 2011, pp. 191-217.

Urban et al, "Polymer Dispersions and their Industrial Applications", Wiley-VCH, 2002, pp. 399-408.

Urban et al., "Anwendungen in der Klebstoffindustrie", Wässrige Polymerdispersionen: Synthese, Eigenschaften, Anwendungen. Hrsg. Dieter Distler, Chapter-7, Wiley-VCH, 1999, pp. 125-170.

Verlag Chemie, "Polyacryl—Verbindungen bis Quecksilber", Ullmanns Encyklopädie der technischen Chemie, 4th edition, vol. 19, 1980, pp. 62-65.

Verlag Chemie, "Polyacryl—Verbindungen bis Quecksilber", Ullmanns Encyklopädie der technischen Chemie, 4th edition, vol. 19, 1980, pp. 311-313.

Written Opinion received for PCT Application No. PCT/EP2022/060048, mailed on Aug. 26, 2022, 5 pages.

* cited by examiner

PROCESS FOR PREPARING COATED SHAPED BODIES AND THEIR USE

CROSS-REFERENCE TO RELATED APPLICATIONS

This application is the National Stage entry under § 371 of International Application No. PCT/EP2022/060048, filed on Apr. 14, 2022, and which claims the benefit of priority to European Application No. 21169887.3, filed on Apr. 22, 2021. The content of each of these applications is hereby incorporated by reference in its entirety.

The invention relates to a process for the coating of particles of an expanded thermoplastic elastomer comprising the steps of a1) bringing the particles into contact with a water-based binder resulting in at least partly coated particles and a2) drying the coated particles. The invention further relates to a process for the preparation of a shaped body comprising the step of b) coating of particles of an expanded thermoplastic elastomer according to the above process, wherein before step a2) the particles are brought into the shape of the shaped body or wherein after step a2) the particles are brought into the shape of the shaped body and contacted with a solvent, preferably a water-based solvent, or by subjecting the particles to heat. The invention further relates to a shaped body obtainable by such processes and its use as well as the use of a water-based binder for the preparation of a shaped body, wherein the shaped body is formed by particles of an expanded thermoplastic elastomer and wherein the particles are at least partly coated with the water-based binder.

Expanded thermoplastic polymers are used, for example, for the production of any solid foam bodies, for example for exercise mats, body protectors, lining elements in automobile construction, sound and vibration dampers, packaging or shoe soles.

Conventionally, a mold with foam particles made of an expanded polymer is filled followed by melting the individual foam particles on their surface by the action of heat and in this way to connect them to one another to form a particle foam. Thus, in addition to simple, complex semi-finished products or molded parts with undercuts can be produced.

Expanded thermoplastic elastomers are known in the art. For example, WO 2018/082984 A1 describes particle foams based on expanded thermoplastic elastomers. WO2008/087078 A1 describes hybrid systems consisting of foamed thermoplastic elastomers and polyurethanes.

An exemplary thermoplastic polymer is expanded thermoplastic polyurethane (E-TPU), which is commercially available, e.g. marketed by BASF under the name Infinergy®. E-TPU particles represent closed-cell particle foam. Thermoplastic polyurethane (e.g. Elastollan®) is expanded resulting in a particle foam with a bulk density of about 110 kilograms per cubic meter and can be processed on standard molding machines, resulting in a molded part weight of between 200 and 320 kilogram per cubic meter. Thanks to its closed-cell structure, E-TPU also absorbs little water, less than two percent by volume in 24 hours. Like the TPU on which it is based, it is also characterized by very high breaking elongation (between 100 and 150 percent depending on the density), tensile strength (approx. 600 kilopascals) and abrasion resistance, combined with good chemical resistance.

Fast prototyping of 3D objects made out of expanded thermoplastic elastomers is nowadays not easy to realize. Typically, isocyanate containing binders are used for ponding the particles or a water vapor and appropriate machines. Both approaches are not easily accessible due to heath safety reasons or due to lack of accessibility of appropriate machinery. Moreover, the use of water vapor allows only molding particle of the same kind, whereas a coating on an E-TPU bead or the usage of a water-based binder may allow bonding E-TPU particles of different kind (Tg, Melting point) and size, but also bonding of different TPUs. The application of a coating allows as well incorporation of additivities, like pigments or dyes, flame retardants or anti-static agents, directly to the bead surface.

Thus, an object of the invention is to provide methods for readily preparing 3D objects (shaped bodies) from expanded thermoplastic elastomer particles without the need of expensive machinery, preferably 3D objects that are handmade, under consideration of heath safety aspects enabling access to the preparation 3D objects by non-professional end user and even underage persons.

The object is achieved by a coating process using a water-based binder followed by different preparation steps in order to prepare shaped bodies that have the use of the coated particles in common.

Thus, a first aspect of the present invention is a process for the coating of particles of an expanded thermoplastic elastomer comprising the steps of a1) bringing the particles into contact with a water-based binder resulting in at least partly coated particles;

a2) drying the coated particles.

In a further aspect of the present invention shaped bodies are prepared by a process for the preparation of a shaped body comprising the step of b1) coating of particles of an expanded thermoplastic elastomer according to the inventive process above, wherein before step a2) the particles are brought into the shape of the shaped body.

Accordingly, in a preferred embodiment of the present invention step b1) is before step a2) and before step a1) or after step a1).

This results in a process for the preparation of a shaped body comprising the step of b1) bringing particles of an expanded thermoplastic elastomer into the shape of a shaped body;

a1) bringing the particles into contact with a water-based binder resulting in at least partly coated particles;

a2) drying the coated particles.

In this process, a shape forming step is a first step and the shaped body is brought into contact with the water-based binder in order to coat the particles. This can be carried out, e.g., by putting the particles into a shaped forming part and rinsing the binder onto the remaining surface of the particle filling. After the drying step a) the shaped body is obtained having the negative form of the shape forming part.

A different order of steps is given in a process for the preparation of a shaped body comprising the step of a1) bringing particles of an expanded thermoplastic elastomer into contact with a water-based binder resulting in at least partly coated particles;

b1) bringing the particles into the shape of a shaped body;

a2) drying the coated particles.

In this process, the particles are brought into shape after these are already coated with the water-based binder. This can be carried out, e.g., by putting the coated particles into a shaped forming part and drying the shaped body having the negative form of the shape forming part.

In a further process of the present invention, a shaped body is prepared in a process comprising the step of b2) coating of particles of an expanded thermoplastic elastomer according to the inventive process above for the coating of particles of an expanded thermoplastic elastomer, wherein after step a2) the particles are brought into the shape of the shaped body and contacted with a solvent, preferably a water-based solvent, or by subjecting the particles to heat.

Accordingly, the shape forming step is carried out after having prepared dried coated particles. In view of the drying step the binder coating has to be "reactivated" in order to bind the particles to each other. This is accomplished by a solvent or by heat. For health safety reasons a water-based solvent and especially pure water should be used.

Thus, the process comprises the steps of a1) bringing the particles into contact with a water-based binder resulting in at least partly coated particles;

a2) drying the coated particles;

b2) bringing the coated particles into the shape of the shaped body and contacting the particles with a solvent, preferably a water-based solvent, or by subjecting the particles to heat.

This process has the advantage that the coating with the binder can result in a commercial product, so that an end user can simply use a solvent, e.g. water, or heat in order to prepare the shaped body. The expression "contacting the particles with a solvent, preferably a water-based solvent, or by subjecting the particles to heat" is meant to use at least one option, i.e. solvent or heat, or both options, which is however not required.

The solvent to be used is any suitable solvent for reactivating the binder. Preferred solvents are those described herein for the polymer dispersions. Thus, mixtures of water with water-miscible solvents are preferred, which are preferably substantially free from organic solvents. Most preferred is water as such.

The heating of the particles can be carried out before or after bringing the particles into shape.

Particles of expanded thermoplastic elastomers are known in the art. Suitable thermoplastic elastomers are, for example, thermoplastic polyurethanes (TPU), thermoplastic polyester elastomers (e.g. polyetherester and polyesterester), thermoplastic copolyamides (e.g. Polyether copolyamides) or thermoplastic styrene butadiene block copolymers. Foam particles based on thermoplastic polyurethane (TPU) are particularly preferred. Thus, preferably the expanded thermoplastic elastomer is E-TPU.

Examples of methods for preparing expanded thermoplastic elastomer particles are described in WO 2008/087078 A1, WO 2018/082984 A1, U.S. Pat. No. 10,005,218 B2 and WO 2007/082838 A1.

In order to adhere to each other the particles of the expanded thermoplastic elastomer are coated with a water-based binder that serves as "glue" responsible for adhesion of the particles after drying.

In a preferred embodiment, the water-based binder is used in form of an aqueous polymer dispersion or solution. The polymer used as binder is also referred to herein as "polymer binder". The term "aqueous" means that the liquid in which the polymer is dispersed or solved is a mixture of liquids with a water content of more than 50% by weight based on the total weight of the mixture of liquids or the polymer is dispersed or dissolved in water as such. Suitable mixtures are mixtures or water with alcohol or the like. Mixtures are preferably mixtures of water with water-miscible solvents, for example alcohols, such as methanol, ethanol, n-propanol, isopropanol, n-butanol, sec-butanol, tert-butanol, n-hexanol and cyclohexanol; glycols, such as ethylene glycol, propylene glycol and butylene glycol; the methyl or ethyl ethers of dihydric alcohols, diethylene glycol, triethylene glycol, polyethylene glycols having number-average molecular weights up to about 3000, glycerol and dioxane, and ketones, such as acetone in particular. In one specific embodiment the aqueous dispersion or solution is substantially free from organic solvents. "Substantially free from organic solvents" is to be understood as meaning that the proportion of organic solvents is not more than 5% by weight, particularly preferably not more than 1% by weight, in particular not more than 0.1% by weight, based on the total weight of the solvent.

Polymer binders can be all film forming polymer dispersions from the product classes well known in the art, i.e. acrylic dispersions, styrene-acrylic dispersions, vinylester dispersions, ethylene vinylester dispersions, styrene butadiene dispersions, which are all prepared by free radical emulsion polymerization. Suitable binders are also the well-known polyurethane dispersions, prepared by polyaddition reaction of isocyanates and polyols and subsequent dispersion in water, as well as the polyurethane-polyacrylate hybrid dispersions and polyurethane-polystyrene-butadiene hybrid dispersions. In each of these product classes, a large variety of monomers can be used in order tailor e.g. the glass transition temperature (Tg), the colloidal stability and other properties. Preferred polymer binders in form of water-based aqueous polymeric dispersions are aqueous polystyrene acrylic dispersions, aqueous acrylic dispersions, aqueous butadiene/styrene dispersions or aqueous polyurethane dispersions. More preferably, the water-based aqueous polymeric dispersion is an aqueous acrylic dispersion or an aqueous polyurethane dispersion. Even more preferably, the water-based aqueous polymeric dispersion is an aqueous polyurethane dispersion.

Film formation is an essential feature of all polymer dispersions. At a temperature above the so-called "Minimum Film Forming Temperature" (MFFT), the individual dispersions form upon drying a coherent polymer film with good mechanical properties (J. Keddie, A. Routh, Fundamentals of Latex Film Formation, Springer Laboratory, 2010). When a polymer dispersion is coated on TPU particles and dried at a temperature above the MFFT, the polymer can form a good physical bond to the TPU particle surface.

In case the water-based binder is an aqueous polymeric dispersion it is preferred that the particles have a minimum film formation temperature (MMFT) of below 70° C., more preferably below 50° C., even more preferably below 25° C. The MMFT represents the lowest temperature at which the dispersion polymer particles can coalesce and form a continuous film. For most polymer dispersions this MMFT is close to the glass transition temperature ($T_g$) or slightly below the $T_g$. Commercial instruments are available for measuring the MMFT, like MMFT 90 by Rhopoint Instruments. The measurements can be carried out according to DIN ISO 2115:2001-04.

The minimum film formation temperature is correlated with the glass transition temperature of the polymer dispersions, which describes the onset of the segmental mobility of the polymer particles. In polymer binders prepared by radical emulsion polymerization, the monomers are preferably selected such that the measured glass transition temperature of the polymer binder is in the range from −40° C. to +70° ° C., in particular from −35° C. to +25° C. or from −10° C. to +20° C. Through targeted variation of monomer type and quantity, those skilled in the art are able according to the invention to produce aqueous polymer compositions whose polymers have a glass transition temperature in the desired range. Orientation is possible using the well-known Fox equation. The glass transition temperature of copolymers is given to a good approximation by:

$$1/T_g = x^1/T_g^1 + \ldots x^n/T_g^n,$$

wherein $x^1$, $x^2$, . . . $x^n$ are the mass fractions of the monomers 1, 2, . . . n and $T_g^1$, $T_g^2$, . . . $T_g^n$ are the glass transition temperatures in degrees kelvin of the polymers constructed from only one of the monomers 1, 2, . . . n at a time. The $T_g$ values for the homopolymers of the majority of monomers are known.

The glass transition temperature can be determined by differential scanning calorimetry (ASTM D 3418-08, so-called midpoint temperature). The glass transition temperature of the polymer in the polymer dispersion is the glass transition temperature obtained when evaluating the second heating curve (heating rate 20° C./min).

The glass transition and minimum film formation temperature of polyurethane dispersions follows a different structure property correlation than emulsion polymers. In the literature, polyurethane dispersions are generally considered as microphase separated systems containing a hard phase containing the polyurethane segments and a soft phase containing the long chain polydiol building blocks e.g. polyether, polyester or polycarbonate diols with molecular weights typically ranging from approximately 500 to 5000 Da. The Tg of the soft phase is typically in the range of −60 to −10° C. The MFFT of polyurethane dispersions depends on the Tg and the weight fraction of the hard block.

Polymer dispersions prepared by radical emulsion polymers can be employed as the polymer binder.

Monomers which are capable of free radical polymerization are in particular monoethylenically unsaturated monomers, such as

- olefins, e.g. ethylene,
- vinylaromatic monomers, such as styrene, α-methylstyrene, o-chlorostyrene or vinyltoluenes, vinyl and vinylidene halides, such as vinyl and vinylidene chloride,
- esters of vinyl alcohol and monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of, in general, 1 to 12, preferably 1 to 8, in particular 1 to 4, carbon atoms, in particular methyl, ethyl, n-butyl, isobutyl and 2-ethylhexyl acrylate and methacrylate, dimethyl maleate or n-butyl maleate,
- nitriles of α,β-monoethylenically unsaturated carboxylic acids, such as acrylonitrile, and
- conjugated $C_4$-$C_8$-dienes, such as 1,3-butadiene and isoprene.

As a rule, the stated monomers are the main monomers which together usually account for more than 50% by weight, based on the total amount of the monomers to be polymerized by the free radical aqueous emulsion polymerization.

Monomers which, when polymerized by themselves, would give homopolymers which have a high water solubility are usually copolymerized only as modifying monomers in amounts of less than 50, as a rule, from 0.5 to 20, preferably from 1 to 10, % by weight, based on the total amount of the monomers to be polymerized.

Examples of such monomers are α,β-monoethylenically unsaturated mono- and dicarboxylic acids of 3 to 6 carbon atoms and their amides, e.g. acrylic acid, methacrylic acid, maleic acid, fumaric acid, itaconic acid, acrylamide and methacrylamide and N-vinylpyrrolidone.

Further, α,β-monoethylenically unsaturated monomers bearing sulfonic acids and its water soluble salts, e.g. vinyl sulfonic acid, 2-Acrylamido-2-methylpropane sulfonic acid, 2-sulfoethyl methacrylate, sodium 4-styrenesulfonate, 3-sulfopropyl methacrylate and 3-sulfopropyl acrylate.

In addition, phosphate esters of polyethylene glycol mono (meth)acrylate and its water-soluble salts where polyethylene glycol vary from 1-22 repeating units.

Monomers which usually increase the internal strength of the films of the aqueous polymer dispersion are as a rule likewise copolymerized only in minor amounts, in general from 0.5 to 10% by weight, based on the total amount of monomers to be polymerized. Usually, such monomers have an epoxy, hydroxyl, N-methylol or carbonyl group or at least two nonconjugated ethylenically unsaturated double bonds.

Examples of these are N-alkylolamides of α,β-monoethylenically unsaturated carboxylic acids of 3 to 10 carbon atoms and their esters with alcohols of 1 to 10 carbon atoms, among which N-methylolacrylamide and N-methylolmethacrylamide are very particularly preferred, silanized monomers, such as γ-methacryloyloxypropylsilane or vinyl trimethoxysilane, monomers having two vinyl radicals, monomers having two vinylidene radicals and monomers having two alkenyl radicals. The diesters of dihydric alcohols with α,β-monoethylenically unsaturated monocarboxylic acids are particularly suitable, among which acrylic and methacrylic acid are once again preferably used. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the hydroxy-$C_1$-$C_8$-alkyl esters of methacrylic and so acrylic acid, such as hydroxyethyl, hydroxy-n-propyl or hydroxy-n-butyl acrylate and methacrylate, and compounds such as diacetoneacrylamide and acetyl acetoxyethyl acrylate and methacrylate.

In particular, monomer mixtures which can be subjected to free radical aqueous emulsion polymerization to give aqueous polymer dispersions are those which are composed of

- from 70 to 100% by weight of esters of acrylic and/or methacrylic acid with alkanols of 1 to 12 carbon atoms and optional styrene or
- from 70 to 100% by weight of styrene and butadiene or
- from 70 to 100% by weight of vinyl chloride and/or vinylidene chloride or
- from 40 to 100% by weight of vinyl acetate and/or vinyl propionate and optional ethylene.

The implementation of radically initiated emulsion polymerizations of ethylenically unsaturated compounds (monomers) in an aqueous medium has been the subject of many prior descriptions and is therefore sufficiently well-known to the skilled person [in this regard, see e.g.: Chemistry and Technology of Emulsion Polymerization Emulsion Polymerization, A. M. van Herk, $2^{nd}$ edition, Wiley 2013;

Polymer Dispersions and their Industrial Applications; D. Urban; K. Takamura (editors, Wiley-VCH, 2002]. The usual format for the radically initiated aqueous emulsion polymerization is that the monomers are dispersed in the aqueous medium, generally with accompaniment of dispersing assistants, such as emulsifiers and/or protective colloids, and are polymerized by means of at least one water-soluble radical polymerization initiator. In the aqueous polymer dispersions obtained, the residual levels of unreacted monomers are frequently lowered by means of chemical and/or physical methods that are likewise known to the skilled person [see, for example, EP-A 771328, DE-A 19624299, DE-A 19621027, DE-A 19741184, DE-A 19741187, DE-A 19805122, DE-A 19828183, DE-A 19839199, and DE-A 19840586 and 19847115], the polymer solids content is adjusted to a desired figure by dilution or concentration, or further customary adjuvants, such as foam or viscosity modifier additives, for example, are added to the aqueous polymer dispersion.

Polyurethanes may also be employed as the polymer binder. Suitable polyurethane dispersions are in principle obtainable by reaction of at least one polyisocyanate with at least one compound having at least two isocyanate-reactive groups and dispersion in water. Suitable polyurethanes also include so-called polyurethane-polyureas comprising not only polyurethane groups but also urea groups. The polyurethane dispersion preferably comprises at least one polyurethane which comprises at least one polyisocyanate and at least one polymeric polyol in copolymerized form. The polyurethane may in particular be formed from at least one polyisocyanate and at least one polymeric polyol. Suitable polymeric polyols are preferably selected from polyester diols, polyether diols, polycarbonate diols and mixtures thereof. The polymeric polyol preferably has a number-average molecular weight in the range from about 500 to 5000 g/mol. Polymeric diols are preferred. The polyurethane dispersion preferably comprises at least one polyurethane which comprises at least one polyisocyanate and a diol component in copolymerized form, of which a) 10-100 mol % based on the total amount of the diols have a molecular weight of 500 to 5000 g/mol and b) 0-90 mol % based on the total amount of the diols have a molecular weight of 60 to 500 g/mol.

The polyurethane is preferably constructed to an extent of at least 40% by weight, particularly preferably to an extent of at least 60% by weight and very particularly preferably to an extent of at least 80% by weight, based on the total weight of the monomers used for producing the polyurethane, from at least one diisocyanate and at least one polyether diol and/or polyester diol. Suitable further synthesis components to 100% by weight include for example the polyisocyanates recited below having at least three NCO groups and compounds distinct from the polymeric polyols having at least two isocyanate-reactive groups. These include for example diols; diamines; polymers distinct from polymeric polyols having at least two active hydrogen atoms per molecule; compounds having two active hydrogen atoms and at least one ionogenic/ionic group per molecule; and mixtures thereof.

The polyurethane preferably has a softening point or melting point in the range from −50° C. to 150° ° C., particularly preferably from 0° ° C. to 100° C. and very particularly preferably from 10° C. to 90° C. It is particularly preferable when the polyurethane has a melting point in the abovementioned temperature range.

Preferred polyurethanes are constructed from:

a) at least one monomeric diisocyanate,
b) at least one diol, wherein the component (b) comprises at least one diol having a number-average molecular weight in the range from 500 to 5000 g/mol,
c) at least one monomer distinct from the monomers (a) and (b) having at least one isocyanate group or at least one isocyanate-reactive group which further bears at least one hydrophilic group or a potentially hydrophilic group,
d) optionally at least one further compound distinct from the monomers (a) to (c) having at least two reactive groups selected from alcoholic hydroxyl groups, primary or secondary amino groups or isocyanate groups, and
e) optionally at least one monofunctional compound distinct from the monomers (a) to (d) having a reactive group which is an alcoholic hydroxyl group, a primary or secondary amino group or an isocyanate group.

The component b) is preferably composed of $b_{1)}$ 10 to 100 mol %, based on the total amount of component b), of diols having a molecular weight of 500 to 5000 g/mol, $b_{2)}$ 0 to 90 mol %, based on the total amount of component b), of diols having a molecular weight of 60 to less than 500 g/mol.

It is particularly preferable when the ratio of the diols $b_1$) to the monomers $b_2$) is 0.1:1 to 5:1, particularly preferably 0.2:1 to 2:1. The diol b) is in particular selected from polytetrahydrofuran, polypropylene oxide and polyesterdiols selected from reaction products of dihydric alcohols with dibasic carboxylic acids and lactone-based polyesterdiols.

Compounds suitable as monomers (a) include in particular diisocyanates $X(NCO)_2$, wherein X is an acyclic aliphatic hydrocarbon radical having 4 to 15 carbon atoms, a cycloaliphatic or aromatic hydrocarbon radical having 6 to 15 carbon atoms or an araliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), such as the trans/trans, the cis/cis and the cis/trans isomers, and mixtures composed of these compounds.

Such diisocyanates are commercially available. Mixtures of these isocyanates of particular importance are the mixtures of the respective structural isomers of diisocyanatotoluene and diisocyanatodiphenylmethane, the mixture of 80 mol % of 2,4-diisocyanatotoluene and 20 mol % of 2,6-diisocyanatotoluene being particularly suitable and preferred. In addition, the mixtures of aromatic isocyanates such as 2,4-diisocyanatotoluene and/or 2,6-diisocyanatotoluene with aliphatic or cycloaliphatic isocyanates, such as hexamethylene diisocyanate or IPDI, are particularly advantageous, the preferred quantitative ratio of the aliphatic isocyanates to aromatic isocyanates being 1:9 to 9:1, in particular 4:1 to 1:4.

The diols (b1) may be polyester polyols and these are known for example from Ullmann's Encyclopedia of Industrial Chemistry, 4th edition, volume 19, pp. 62 to 65. Preference is given to using polyester polyols obtained by reaction of dihydric alcohols with dibasic carboxylic acids. Instead of using the free polycarboxylic acids, the polyester polyols may also be produced using the corresponding polycarboxylic anhydrides or corresponding polycarboxylic esters of lower alcohols or mixtures thereof. The polycarboxylic acids may be aliphatic, cycloaliphatic, araliphatic, aromatic or heterocyclic and may optionally be substituted, for example by halogen atoms, and/or unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preference is given to dicarboxylic acids of the general formula HOOC—$(CH_2)_y$—COOH, wherein y is a number from 1 to 20, preferably an even number from 2 to 20, for example succinic acid, adipic acid, sebacic acid and dodecanedicarboxylic acid. Suitable dihydric alcohols are, for example, ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preferred alcohols are those of the general formula HO—$(CH_2)_x$—OH, wherein x is a number from 1 to 20, preferably an even number from 2 to 20. Examples thereof are ethylene glycol, butane-1,4-diol, hexane-1,6-diol, octane-1,8-diol and dodecane-1,12-diol. Neopentyl glycol is also preferred.

The diols (b1) may also be polycarbonate diols such as are obtainable for example by reaction of phosgene with an excess of the low molecular weight alcohols recited as synthesis components for the polyester polyols.

The diols (b1) may also be lactone-based polyester diols, specifically homopolymers or copolymers of lactones, preferably terminal hydroxyl-comprising addition products of lactones onto suitable difunctional starter molecules. Contemplated lactones preferably include those derived from compounds of the general formula HO—$(CH_2)_z$—COOH, wherein z is a number from 1 to 20 and one hydrogen atom of a methylene unit may also be substituted by a $C_1$- to $C_4$-alkyl radical. Examples include epsilon-caprolactone, beta-propiolactone, gamma-butyrolactone and/or methyl-gamma-caprolactone and mixtures thereof. Suitable starter components are, for example, the low-molecular weight-dihydric alcohols recited hereinabove as synthesis components for the polyester polyols. The corresponding polymers of epsilon-caprolactone are particularly preferred. Lower polyester diols or polyether diols may also be employed as starters for producing the lactone polymers. Instead of the polymers of lactones, the corresponding, chemically equivalent polycondensates of the hydroxycarboxylic acids corresponding to the lactones may also be employed.

The diols (b1) may also be polyether diols. Polyether diols are obtainable in particular by homopolymerization of ethylene oxide, propylene oxide, butylene oxide, tetrahydrofuran, styrene oxide or epichlorohydrin, for example in the presence of $BF_3$, or by addition of these compounds optionally in admixture or in succession onto starting components having reactive hydrogen atoms, such as alcohols or amines, for example water, ethylene glycol, propane-1,2-diol, propane-1,3-diol, 2,2-bis(4-hydroxyphenyl)propane or aniline. Polyether diols having a molecular weight of 500 to 5000 and especially 600 to 4500 are particularly preferred. Particularly preferred polyether diols are polypropylene oxide and polytetrahydrofuran. Suitable polytetrahydrofurans may be produced by cationic polymerization of tetrahydrofuran in the presence of acidic catalysts, such as for example sulfuric acid or fluorosulfuric acid. Such methods of production are known to those skilled in the art. Suitable compounds b1) further include alpha, omega-diaminopolyethers producible by amination of polyalkylene oxides with ammonia.

$b_1$) only includes polyether diols formed to an extent of less than 20% by weight, based on their total weight, of ethylene oxide. Polyether diols comprising at least 20% by weight of incorporated ethylene oxide units are hydrophilic polyether diols that are included among the monomers c).

Optionally co-usable as monomers $b_1$) are also polyhydroxyolefins, preferably those having 2 terminal hydroxyl groups, for example alpha-omega-dihydroxypolybutadiene, alpha-omega-dihydroxypolymethacrylate esters or alpha-omega-dihydroxypolyacrylate esters as monomers. Such compounds are disclosed in EP-A 622 378 for example. Further suitable polyols are polyacetals, polysiloxanes and alkyd resins.

It is preferable when at least 95 mol % of the diols $b_1$) are polyester diols and/or polytetrahydrofuran. It is particularly preferable to employ exclusively polyesterdiols and/or polytetrahydrofuran as diols $b_1$).

The hardness and the modulus of elasticity of the polyurethanes can be increased when as diols (b) not only the diols $b_1$) but also low-molecular-weight diols $b_2$) having a molecular weight of about 60 to 500, preferably of 62 to 200 g/ml, are employed. Employed monomers $b_2$) especially include the synthesis components of the short-chain alkanediols recited for the production of polyester polyols, wherein the unbranched diols having 2 to 12 carbon atoms and an even number of carbon atoms and also pentane-1,5-diol and neopentyl glycol are preferred. Contemplated diols $b_2$) include for example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preferred alcohols are those of the general formula HO—$(CH_2)_x$OH, wherein x is a number from 1 to 20, preferably an even number from 2 to 20. Examples thereof are ethylene glycol, butane-1,4-diol, hexane-1,6-diol, octane-1,8-diol and dodecane-1,12-diol. Neopentyl glycol is also preferred.

In order to ensure that the polyurethanes are water-dispersible, the polyurethanes comprise as a synthesis component monomers (c) which are distinct from the components (a) and (b) and bear at least one isocyanate group or at least one isocyanate-reactive group and moreover bear at least one hydrophilic group or a group which can be converted into a hydrophilic group. Hereinbelow, the term “hydrophilic groups or potentially hydrophilic groups” is abbreviated to “(potentially) hydrophilic groups”. The (potentially) hydrophilic groups react with isocyanates substantially more slowly than the functional groups of the monomers used to construct the polymer main chain. The proportion of components comprising (potentially) hydrophilic groups in the total amount of components (a) to (f) is generally measured such that the molar amount of the (potentially) hydrophilic groups (preferably anionic or potentially anionic groups) based on the amount by weight of all monomers (a) to (e) is 30 to 1000, preferably 50 to 500 and particularly preferably 80 to 300 mmol/kg. The (potentially) hydrophilic groups may be nonionic or preferably (potentially) ionic hydrophilic groups.

Contemplated nonionic hydrophilic groups include in particular polyethylene glycol ethers composed of preferably 5 to 100, preferably 10 to 80, ethylene oxide repeating units. The content of polyethylene oxide units is generally 0% to 10% by weight, preferably 0% to 6% by weight, based on the amount by weight of all monomers (a) to (e). Preferred monomers comprising nonionic hydrophilic groups are polyethylene oxide diols comprising at least 20% by weight of ethylene oxide, polyethylene oxide monools and the reaction products of a polyethylene glycol and a diisocyanate which bear a terminally etherified polyethylene glycol radical. Such diisocyanates and processes for their production are recited in patent documents U.S. Pat. Nos. 3,905,929 and 3,920,598.

Ionic hydrophilic groups are especially anionic groups, such as the sulfonate, carboxylate and the phosphate group in the form of their alkali metal or ammonium salts, and cationic groups, such as ammonium groups, in particular protonated tertiary amino groups or quaternary ammonium groups. Potentially ionic hydrophilic groups are especially those which may be converted into the abovementioned ionic hydrophilic groups by simple neutralization, hydrolysis or quaternization reactions, i.e. carboxylic acid groups or tertiary amino groups for example. (Potentially) ionic monomers (c) are described in detail for example in Ullmann's Encyclopedia of Industrial Chemistry, 4th edition, volume 19, pp. 311-313 and for example in DE-A 1 495 745.

(Potentially) cationic monomers (c) of particular practical importance are especially monomers comprising tertiary amino groups, for example: tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, wherein the alkyl radicals and alkanediyl units of these tertiary amines are independently of one another composed of 1 to 6 carbon atoms. Also contemplated are polyethers comprising tertiary nitrogen atoms and preferably two terminal hydroxyl groups, such as are obtainable in a manner customary per se for example by alkoxylation of amines comprising two hydrogen atoms attached to amine nitrogen, for example methylamine, aniline or N,N'-dimethylhydrazine. Such polyethers generally have a molar weight of between 500 and 6000 g/mol. These tertiary amines are converted into the ammonium salts either with acids, preferably strong mineral acids such as phosphoric acid, sulfuric acid, hydrohalic acids, or strong organic acids or by conversion with suitable quaternization agents such as $C_1$- to $C_6$-alkyl halides or benzyl halides, for example bromides or chlorides.

Contemplated monomers comprising (potentially) anionic groups typically include aliphatic, cycloaliphatic, araliphatic or aromatic carboxylic acids and sulfonic acids bearing at least one alcoholic hydroxyl group or at least one primary or secondary amino group. Preference is given to dihydroxyalkylcarboxylic acids, especially comprising 3 to 10 carbon atoms, as also described in U.S. Pat. No. 3,412,054. Preferred compounds include in particular compounds of the general formula ($c_1$)

($c_1$)

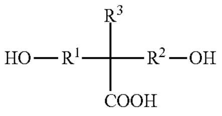

in which $R^1$ and $R^2$ represent a $C_1$- to $C_4$-alkanediyl (unit) and $R^3$ represents a $C_1$- to $C_4$-alkyl (unit), especially dimethylolpropionic acid (DMPA). Corresponding dihydroxysulfonic acids and dihydroxyphosphonic acids such as 2,3-dihydroxypropanephosphonic acid are also suitable. Also suitable are dihydroxy compounds having a molecular weight of more than 500 to 10 000 g/mol and comprising at least 2 carboxylate groups, as disclosed in DE-A 39 11 827. These are obtainable by reacting dihydroxy compounds with tetracarboxylic dianhydrides, such as pyromellitic dianhydride or cyclopentanetetracarboxylic dianhydride in a molar ratio of 2:1 to 1.05:1 in a polyaddition reaction. Suitable dihydroxy compounds are in particular the monomers (b2) cited as chain extenders and the diols (b1).

Contemplated monomers (c) comprising isocyanate-reactive amino groups also include aminocarboxylic acids such as lysine, beta-alanine or the adducts, cited in DE-A 20 34 479, of aliphatic diprimary diamines onto alpha,beta-unsaturated carboxylic or sulfonic acids. Such compounds for example conform to the formula ($c_2$)

$$H_2N—R^4—NH—R^5—X \qquad (c_2)$$

in which $R^4$ and $R^5$ independently of one another represent a $C_1$- to $C_6$-alkanediyl unit, preferably ethylene; and X represents COOH or $SO_3H$. Particularly preferred compounds of formula ($c_2$) are N-(2-aminoethyl)-2-aminoethanecarboxylic acid and N-(2-aminoethyl)-2-aminoethanesulfonic acid and the corresponding alkali metal salts, wherein sodium is a particularly preferred counterion. Also particularly preferred are the adducts of the abovementioned aliphatic diprimary diamines onto 2-acrylamido-2-methylpropanesulfonic acid, as described for example in DE-B 1 954 090.

Where monomers containing potentially ionic groups are employed, their conversion into the ionic form may take place before, during, but preferably after the isocyanate polyaddition, since the solubility of the ionic monomers in the reaction mixture is frequently no more than poor. Neutralizing agents are for example ammonia, NaOH, triethanolamine (TEA), triisopropylamine (TIPA) or morpholine, and derivatives thereof. The sulfonate or carboxylate groups are especially preferably present in the form of their salts with an alkali metal ion or with an ammonium ion as the counterion.

The monomers (d) which are distinct from the monomers (a) to (c) and which are optionally also constituents of the polyurethane are generally used for crosslinking or chain extension. They are generally more than dihydric nonphenolic alcohols, amines comprising 2 or more primary and/or secondary amino groups and compounds bearing one or more primary and/or secondary amino groups in addition to one or more alcoholic hydroxyl groups. Alcohols having a hydricity greater than 2 and which may be used to establish a certain degree of branching or crosslinking are, for example, trimethylolpropane, glycerol and sugar.

Also contemplated are monoalcohols which carry not only the hydroxyl group but also a further isocyanate-reactive group such as monoalcohols having one or more primary and/or secondary amino groups, for example monoethanolamine. Polyamines having 2 or more primary and/or secondary amino groups are primarily used when the chain extension and/or crosslinking is to take place in the presence of water since amines generally react with isocyanates more rapidly than alcohols or water. This is often necessary when aqueous dispersions of crosslinked polyurethanes or polyurethanes of high molecular weight are desired. The procedure in such cases comprises producing prepolymers comprising isocyanate groups, rapidly dispersing said prepolymers in water and subsequently chain-extending or crosslinking said prepolymers by adding compounds comprising a plurality of isocyanate-reactive amino groups.

Amines suitable for this purpose are generally polyfunctional amines in the molecular weight range from 32 to 500 g/mol, preferably from 60 to 300 g/mol, which comprise at least two amino groups selected from the group of the primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. The amines may also be employed in blocked form, for example in the form of the corresponding ketimines (see, for example, CA-A 1 129 128), ketazines (cf., for example, U.S. Pat. No. 4,269,748) or amine salts (see U.S. Pat. No. 4,292,226). Oxazolidines, as are used, for example, in U.S. Pat. No. 4,192,937, also represent capped polyamines which can be used for producing the polyurethanes according to the invention for chain extension of the prepolymers. Use of such capped polyamines generally comprises mixing said polyamines with the prepolymers in the absence of water and subsequently mixing this mixture with the dispersion water or a portion of the dispersion water, thus releasing the corresponding polyamines hydrolytically. It is preferable to use mixtures of di- and triamines, particularly preferably mixtures of isophorone diamine (IPDA) and diethylene triamine (DETA).

The polyurethanes preferably comprise 1 to 30 mol %, particularly preferably 4 to 25 mol %, based on the total amount of the components (b) and (d) of a polyamine comprising at least 2 isocyanate-reactive amino groups as monomers (d). Higher than difunctional isocyanates may also be used as monomers (d) for the same purpose. Commercially available compounds are, for example, the isocyanurate or the biuret of hexamethylene diisocyanate.

Monomers (e) that are optionally co-used are monoisocyanates, monoalcohols and monoprimary and -secondary amines. The proportion thereof is generally not more than 10 mol %, based on the total molar amount of the monomers. These monofunctional compounds typically bear further functional groups such as olefinic groups or carbonyl groups and serve to introduce functional groups into the polyurethane which make the dispersal or crosslinking or further polymer-analogous reaction of the polyurethane possible. Contemplated therefor are monomers such as isopropenyl-a,a'-dimethylbenzyl isocyanate (TMI) and esters of acrylic or methacrylic acid such as hydroxyethyl acrylate or hydroxyethyl methacrylate.

Coatings having a particularly good profile of properties are obtained especially when the monomers (a) employed are substantially only aliphatic diisocyanates, cycloaliphatic diisocyanates or araliphatic diisocyanates. This monomer combination is superbly complemented as component (c) by alkali metal salts of diaminosulfonic acid; very particularly by N-(2-aminoethyl)-2-aminoethanesulfonic acid and its corresponding alkali metal salts, wherein the Na salt is most suitable, and a mixture of DETA and IPDA as component (d).

Also preferred are polyurethanes, wherein the diisocyanates a) are selected from diisocyanates of the formula $X(NCO)_2$, wherein X represents an acyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms, preferably selected from the group consisting of hexamethylene diisocyanate, 1-isocyanato-3,5,5-trimethyl-5-isocyanatomethylcyclohexane, 2,6-diisocyanatotoluene, 2,4-diisocyanatotoluene and tetramethylxylylene diisocyanate or a mixture thereof;

the diols b1) are selected from polyester diols, polycarbonate diols and polyether diols; and the compound c) is selected from dihydroxycarboxylic acids, diaminocarboxylic acids and diaminosulfonic acids.

The way in which the molecular weight of the polyurethanes may be adjusted through choice of the proportions of the mutually reactive monomers and of the arithmetic mean of the number of reactive functional groups per molecule is common general knowledge in the field of polyurethane chemistry. The components (a) to (e) and their respective molar amounts are normally chosen such that the ratio A:B where A is the molar amount of isocyanate groups and B is the sum of the molar amount of hydroxyl groups and the molar amount of functional groups which are capable of reacting with isocyanates in an addition reaction, is 0.5:1 to 2:1, preferably 0.8:1 to 1.5:1, particularly preferably 0.9:1 to 1.2:1. It is very particularly preferable when the ratio A:B is very close to 1:1.

The monomers (a) to (e) employed bear on average typically from 1.5 to 2.5, preferably from 1.9 to 2.1 and particularly preferably 2.0 isocyanate groups or functional groups capable of reacting with isocyanates in an addition reaction.

The polyaddition of the components (a) to (e) to produce the polyurethane is preferably carried out at reaction temperatures of up to 180° C., preferably up to 150° C., under standard pressure or under autogenous pressure. The production of polyurethanes and of aqueous polyurethane dispersions is known to those skilled in the art.

In the context of the present invention an aqueous polyurethane dispersion is to be understood as meaning a dispersion which has an aqueous solvent as the continuous phase. Suitable aqueous solvents are water and mixtures of water with water-miscible solvents, for example alcohols, such as methanol, ethanol, n-propanol, isopropanol, n-butanol, sec-butanol, tert-butanol, n-hexanol and cyclohexanol; glycols, such as ethylene glycol, propylene glycol and butylene glycol; the methyl or ethyl ethers of dihydric alcohols, diethylene glycol, triethylene glycol, polyethylene glycols having number-average molecular weights up to about 3000, glycerol and dioxane, and ketones, such as acetone in particular. In one specific embodiment the polyurethane dispersion is substantially free from organic solvents. "Substantially free from organic solvents" is to be understood as meaning that the proportion of organic solvents is not more than 5% by weight, particularly preferably not more than 1% by weight, in particular not more than 0.1% by weight, based on the total weight of the solvent.

Preferably, the production of the polyurethanes is carried out in the presence of at least one organic solvent. Preferred organic solvents for production of the polyurethanes are ketones, such as acetone and methyl ethyl ketone, and N-methylpyrrolidone. Particular preference is given to using acetone. If an at least partially water-miscible solvent is used to produce the polyurethanes, the polyurethane dispersion according to the invention may contain not only water but also the organic solvent used for production. It will be appreciated that the production of the polyurethane dispersions according to the invention may be carried out in the presence of at least one organic solvent, with said solvent subsequently being partially or completely replaced with water.

The pH of the polymer binder dispersion is preferably adjusted to a pH greater than 5, in particular to a pH between 5.5 and 8.

Preferred dispersion adhesive compositions have a viscosity of 12 s to 26 s, particularly preferably of 13 s to 20 s at 23° C., measured with DIN flow cup no. 4 according to DIN EN ISO 2431:2011.

Preferred dispersion adhesive compositions have a value of greater than 120 minutes in the Billhöfer foam test (see examples) measured at 250 m/min.

The above dispersions can be used without or with so-called crosslinkers as described in the following. In case a crosslinker is used, the crosslinker can be part of the water-based binder in the processes of the present invention when the particles are brought into contact with the water-based binder (step a1)) or can be added as part of the solvent in step b2).

In order to increase e.g. the mechanical strength and chemical resistance of polymer dispersion films, it is well known to include chemical crosslinking functionalities into polymer dispersions, which lead to the formation of a crosslinked polymer network (J. W. Taylor, MA. Winnik, J. Coat. Technol. Res. 1 (2004) 163; G. Tillet et al.; Prog. Polym. Sci. 36 (2011) 191). Principally, one can distinguish between one-pack and two pack crosslinking systems. In one-pack crosslinking polymer dispersions, the reactive components are mixed at the time of preparation and the dispersions have a sufficient shelf life of several week or month. In two pack systems a reactive component is mixed with the polymer dispersion just prior to the application, resulting in a reactive system with a shelf life in the range from a few minutes to a few days. Some crosslinking systems cure after film formation, other require curing at elevated temperature. Typical crosslinking systems are

- Water soluble di-hydrazides in combination with a keto-functional monomer like diacetone acrylamide (DAAM), which can be included in a polymer dispersion during the emulsion polymerization or with keto-functional building blocks incorporated into the polyurethane structure during the synthesis of a polyurethane dispersion, e.g. as described in U.S. Pat. No. 4,983,662. The curing of such one-pack systems starts after film at room temperature and can be accelerated by heating;
- Water soluble amines which can react with amine reactive monomers copolymerized in the polymers dispersions like glycidyl functional monomers (e.g. glycidyl methacrylate, GMA) or acetoacetoxy functional monomers (e.g. Aceto acetoxy ethylmethacrylate, AAEMA acrylates (e.g. GMA) ore acetoacetoxy functional monomers (e.g. AAEMA). The curing of such two-pack systems starts after film at room temperature and can be accelerated by heating;
- Dispersions containing methylol group containing monomers, e.g. AMOL, MAMOL. The curing of such one-pack systems requires heating to temperatures >80° C.
- Addition of water dispersible polyisocyanates or polycarbodiimides to polymer dispersions of any kind. The curing of such two-pack systems starts after film at room temperature and can be accelerated by heating;
- Addition of water-soluble or water dispersible polyoxazolines. (EP 3608344.) The curing of such two-pack systems starts after film at room temperature and can be accelerated by heating;
- Addition of Urea formaldehyde ore melamine formaldehyde resins. The curing of such two-pack systems requires heating to temperatures >80° C.

A preferred type of polymer dispersion for the application as binder for TPU particles are dispersions which bonding power can be strongly increased by heating, so called "thermally activatable polymer dispersion". Such polymer dispersions typically contain crystallization building blocks with a melting point above the MFFT. Upon heating above the melting point of the crystallizing building block, the tackiness of the dispersions film increases significantly, leading to a better binding ability of such polymer binders. Typical examples for such polymer dispersions are polyurethane dispersions containing crystalline polyesters as building blocks (US 2012/0021213, WO 2017/133935 and D. Urban, E. Wistuba, "*Anwendungen in der Klebstoffindustrie*" pp. 125-170 in D. Distler (editor) "*Wässrige Polymerdispersionen*", Wiley-VCH 1999) or polyacrylate dispersions containing crystallizable monomers like stearyl acrylate or behenyl acrylate (*European Polymer Journal* 98 (2018) 63-71).

Other suitable water binders can be aminoresins, like the Luwipal and Plastopal from BASF, normally used as binder for the realization of wood boards or epoxy emulsions (e.g. Waterepoxy® 1422 and 1455 from BASF) cured by their amino adducts (Waterepoxy® 751, 760, 801). Moreover, suitable aqueous polymer solutions are known in the art, can be used as binder. Preferably, the aqueous polymer solution is an aqueous polyvinylpyrrolidone solution. The polyvinylpyrrolidone polymers typically have Tg from 100° C. to 180° C., preferably from 105° C. to 180° C.

The aqueous polyvinylpyrrolidone comprises at least one polyvinylpyrrolidone (homopolymer of vinylpyrrolidone or copolymer of vinylpyrrolidone with vinylacetate, vinylimidazol and vinylcaprolactame) dissolved in the aqueous phase. The content of polyvinylpyrrolidone is preferably adjusted such that the Brookfield viscosity of the total composition at 23° C. is from 0.05 Pas to 40 Pas, particularly preferably from 1 s to 40 Pas, measured with DIN flow cup no. 4 according to DIN EN ISO 2431:2011.

The polyvinylpyrrolidone preferably has a K value of 25 to 100, particularly preferably 26 to 98, measured at 25° C. as a 1% solution in water.

For sustainability reasons it is preferred to use bio-based materials for producing the water-based binder, like polyurethane adhesive dispersions. The term "bio-based" indicates that the material is of biological origin and comes from a biomaterial/renewable resources. A material of renewable origin or biomaterial is an organic material wherein the carbon comes from the $CO_2$ fixed recently (on a human scale) by photosynthesis from the atmosphere. A biomaterial (carbon of 100% natural origin) has an isotopic ratio $^{14}C/^{12}C$ greater than $10^{-12}$, typically about $1.2\times10^{-12}$, while a fossil material has a zero ratio. Indeed, the isotopic $^{14}C$ is formed in the atmosphere and is then integrated via photosynthesis, according to a time scale of a few tens of years at most. The half-life of the $^{14}C$ is 5,730 years. Thus, the materials coming from photosynthesis, namely plants in general, necessarily have a maximum content in isotope $^{14}C$. The determination of the content of biomaterial or of bio-carbon can be carried out in accordance with the standards ASTM D 6866-12, the method B (ASTM D 6866-06) and ASTM D 7026 (ASTM D 7026-04).

Suitable bio-based materials, e.g., for producing polyurethanes are for example alcohols (in particular diols and polyols) and organic acids (in particular diacids) derived from natural materials such as starch, saccharose, glucose, lignocellulose, natural rubber or plant oils. Suitable alcohols and organic acids derived from natural materials are for example ethanol, monoethylene glycol, polyethylene glycol, isosorbide, 1,3-propanediol, 1,4-butanediol, glycerol, adipic acid or succinic acid. Preferably, at least part of the polyurethane is made of bio-based materials. Preferably, the proportion of bio-based material compared to the sum of bio-based and non-bio-based material is at least 10 weight-%.

Several options are known to obtain the final shape of the shaped body built up by the particles of an expanded thermoplastic elastomer. In one embodiment the shaping directly results in the desired form, by using, e.g., a negative form of the shaped body as already explained above. Thus, a further aspect of the present invention is a process, wherein the particles of the expanded thermoplastic elastomer are brought into the shape of the shaped body by filling a negative form of the shaped body with the particles.

It is also possible to post shape the shaped body. Here, a regular form, like a cube, is shaped in a first step followed by shaping the regular form to yield the desired shape. Post shaping may be accomplished by a knife or the like.

In another preferred embodiment, the particles of the expanded thermoplastic elastomer are brought into the shape of the shaped body by hand forming the particles. Particularly suitable for so called handmade shaped bodies are processes including step b2).

Preferably, at least one of the step a1), step a2) or steps a1) and a2) are carried out at room temperature.

Another aspect of the present invention is a shaped body obtainable by a process of the invention for the preparation of a shaped body.

Accordingly, another aspect of the invention is a shaped body comprising coated particles of an expanded thermoplastic elastomer, wherein the coating comprises a water-based binder.

Another aspect of the present invention is the use of a water-based binder for the preparation of a shaped body, especially prepared according to a process of the present invention, wherein the shaped body is formed by particles of an expanded thermoplastic elastomer and wherein the particles are at least partly coated with the water-based binder.

Another aspect of the present invention is the use of a shaped body of the present invention in furniture, seating, as cushioning, car wheels or parts of car wheels, toys, animal toys, tires or parts of a tire, saddles, balls and sports equipment, for example sports mats, or as floor covering and wall paneling, especially for sports surfaces, track and field surfaces, sports halls, children's playgrounds and pathways, as shoe sole including midsoles, insoles and combisoles, body protector, paneling for vehicles, as sound and vibration absorbers, especially for suspension forks, stuffing, packaging or mattresses, as protection films, or as grips.

EXAMPLES DISCLOSING THE INVENTION

TPU Synthesis

The preparation of a TPU consisting of:

| | |
|---|---|
| 1000 parts | polyetherpolyol based on tetramethylene oxid with an OH number of 112.2 with a functionality of 2 and only primary OH groups |
| 500 parts | 4,4'-Methylene diphenyl diisocyanate |
| 89.9 parts | 1,4-butane diol |
| 20 parts | stabilizer package consisting of light stabilizer, primary antioxidant and UV-absorber |
| 0.4 parts | Wax based on distearyl ethylene diamide |
| 50 ppm | tin-II-isooctoate (50% in dioctyladipate) |

was carried out in a twin-screw extruder (ZSK58 MC of the company Coperion) with a length of 48D with a temperature of the extruder housing of 150 to 230° C. and a screw speed of 180 to 240 1/min. A gear pump feeds the melt into an under-water-granulation system, whereupon the granulates are getting dried on a fluidized bed at a temperature of 40 to 90° C.

e-TPU Preparation (e-TPU 1) According to U.S. Ser. No. 10/005,218B2.

The dried TPU granulates were fed into a twin-screw extruder (ZSK40 of the company Coperion) together with 0.2% talcum and 0.6% of a TPU, which contains oligomeric 4,4'-Methylene diphenyl diisocyanate with a final functionality of 2.05. The temperature of the machinery parts as extruder and under-water granulation system was in the range of 130 to 220° C. $CO_2$ and $N_2$ were dosed as blowing agents in the molten polymer. Over a gear-pump the polymer melt mixture is processed via an under-water granulation to obtain 27 mg E-TPU beads, which were finally dried at 50-60° C. for 2 h. The final bulk density of the expanded TPU beads was 130 g/L.

Part Synthesis

Example 1: 3D Hybrid Parts Using e-TPU and a Polystyrene Acrylic Dispersion 1, with 50% Solid Content and a MMFT of 20° C. and a pH of 8.3 (Acronal® S 790)

10 g of e-TPU 1 were placed in a 250 mL Polyethylene Cup. 2.5 g of Polystyrene Acrylic dispersion 1 was slowly added to the cup under gentle stirring by means of a wood spatula at room temperature.

The mixture was let drying at room temperature. After evaporation of the water (4 days at room temperature) the e-TPU grains are bonded together and can be taken out from the plastic cup. Thus, a 3D e-TPU hybrid part was obtained.

Example 2: 3D Hybrid Parts Using e-TPU and Polystyrene Acrylic Dispersion 2, with 50% Solid Content and MMFT of ~3° C. and a pH of 6.8 (Acronal® S 559)

10 g of e-TPU 1 were placed in a 250 mL Polyethylene Cup. 2.5 g of Polystyrene Acrylic dispersion 2 was slowly added to the cup under gentle stirring by means of a wood spatula at room temperature.

The mixture was let drying at room temperature. After evaporation of the water (4 days at room temperature) the e-TPU grains are bonded together and can be taken out from the plastic cup. Thus, a 3D e-TPU hybrid part was obtained.

Example 3: 3D Hybrid Parts Using e-TPU and Acrylic Dispersion 3, with 50% Solid Content and a MMFT of 17° C. and a pH of 8.0 (Acronal® A 754)

100 g of e-TPU 1 were placed in a 250 mL Polyethylene Cup. 30 g of Dispersion 3 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 4: 3D Hybrid Parts Using e-TPU and Acrylic Dispersion 4, with 50% Solid Content and a MMFT of 16° C. and a pH of 8.0 (Acronal® DS6262)

100 g of e-TPU 1 were placed in a 250 mL Polyethylene Cup. 30 g of dispersion 4 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 5: 3D Hybrid Parts Using e-TPU and Acrylic Dispersion 5, with 48% Solid Content and a MMFT of 14° C. and a pH of 8.0 (Acronal® DS6266)

100 g of e-TPU 1 were placed in a 250 mL Polyethylene Cup. 30 g of dispersion 5 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 6: 3D Hybrid Parts Using e-TPU and Acrylic Dispersion 6, with 50% Solid Content and a MMFT of 17° C. and a pH of 8.3 (Acronal® A 684)

100 g of e-TPU 1 were placed in a 250 mL Polyethylene Cup. 30 g of dispersion 6 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 7: 3D Hybrid Parts Using e-TPU and Self-Crosslinking Acrylic Dispersion 7, with 42% Solid Content and a MMFT of <3° C. and a pH of 8.0 (Acronal Edge® 6283)

100 g of e-TPU 1 were placed in a 250 mL Polyethylene Cup. 30 g of dispersion 7 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 8: 3D Hybrid Parts Using e-TPU and 1,3 Butadiene/Styrene Dispersion 8 Containing Carboxylic Groups, with 50% Solid Content and a MMFT of −1° C. and a Tg of −7° C. and a pH of 8.3 (Styrofan® D422)

100 g of e-TPU 1 were placed in a 250 mL Polyethylene Cup. 30 g of dispersion 8 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 9: 3D Hybrid Parts Using e-TPU and Polyurethane Dispersion 9, with 45% Solid Content and a Tg of −48° C. and a pH of 8.0 (Luphen® D207 E PUD Reported in US 2012/0021213 and WO 2017/133935)

100 g of e-TPU 1 were placed in a 250 mL Polyethylene Cup. 30 g of dispersion 9 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 10: 3D Hybrid Parts Using e-TPU and Polyurethane Dispersion 10, with 45% Solid Content and a Tg of −47° C. and a pH of 8.5 (Emuldur® 360A)

100 g of e-TPU 1 were placed in a 250 mL Polyethylene Cup. 30 g of dispersion 10 was slowly added to the cup under gentle stirring by means of a wood spatula at room temperature (40 sec). The mixture was placed into a wood form (200×200×15 mm) and was let drying at room temperature. After evaporation of the water (28 hours at room temperature) the e-TPU grains are bonded together and can be taken out from the form. Thus, an e-TPU hybrid plate was obtained.

Example 11: 3D Hybrid Parts Using e-TPU and a 40% Water-Based Solution of Polyvinylpyrrolidone with K Value of 17 (Luvitek® 17, P)

200 g of e-TPU 1 and 66.7 g of a 40% weight solution in distilled water of Polyvinylpyrrolidone (Luvitek® K17, P, K value 17), were mixed by means of a wood spatula at room temperature (1 minute). The wetted E-TPU beads were then places in a wood form (20×100×300 mm), which in advance was coated with a release agent (Indrosil 2000). After evaporation of the water (24 hours at room temperature) the e-TPU grains are bonded together and can be taken out from the form. Thus, an e-TPU hybrid plate was obtained.

Example 12: 3D Hybrid Parts Using e-TPU and a 30% Water-Based Solution of Polyvinylpyrrolidone with K Value of 30 (Luvitek® 30, P)

200 g of e-TPU 1 and 66.7 g of a 30% weight solution in distilled water of Polyvinylpyrrolidone (Luvitek® K30, P, K value 30), were mixed by means of a wood spatula at room temperature (1 minute). The wetted E-TPU beads were then places in a wood form (20×100×300 mm), which in advance was coated with a release agent (Indrosil 2000). After evaporation of the water (24 hours at room temperature) the e-TPU grains are bonded together and can be taken out from the form. Thus, an e-TPU hybrid plate was obtained.

Example 13: 3D Hybrid Parts Using e-TPU and a 20% Water-Based Solution of Polyvinylpyrrolidone with K Value of 85 (Luvitek® 85, P)

200 g of e-TPU 1 and 66.7 g of a 20% weight solution in distilled water of Polyvinylpyrrolidone (Luvitek K85, P, K value 85), were mixed by means of a wood spatula at room temperature (1 minute). The wetted E-TPU beads were then places in a wood form (20×100×300 mm), which in advance was coated with a release agent (Indrosil 2000). After evaporation of the water (24 hours at room temperature) the e-TPU grains are bonded together and can be taken out from the form. Thus, an e-TPU hybrid plate was obtained.

Example 14: 3D Hybrid Parts Using e-TPU and a 20% Water-Based Solution of Polyvinylpyrrolidone with K Value of 90 (Luvitek® 90, P)

200 g of e-TPU 1 and 66.7 g of a 20% weight solution in distilled water of Polyvinylpyrrolidone (Luvitek K90, P, K value 90), were mixed by means of a wood spatula at room temperature (1 minute). The wetted E-TPU beads were then places in a wood form (20×100×300 mm), which in advance was coated with a release agent (Indrosil 2000). After evaporation of the water (24 hours at room temperature) the e-TPU grains are bonded together and can be taken out from the form. Thus, an e-TPU hybrid plate was obtained.

Example 15: 3D Hybrid Parts Using e-TPU and a 20% Water-Based Solution of Polyvinylpyrrolidone with K Value of 94 (Luvitek® 90HM, P)

200 g of e-TPU 1 and 66.7 g of a 20% weight solution in distilled water of Polyvinylpyrrolidone (Luvitek® K90HM, P, K value 94), were mixed by means of a wood spatula at room temperature (1 minute). The wetted E-TPU beads were then places in a wood form (20×100×300 mm), which in advance was coated with a release agent (Indrosil 2000). After evaporation of the water (24 hours at room temperature) the e-TPU grains are bonded together and can be taken out from the form. Thus, an e-TPU hybrid plate was obtained.

Example 16: 3D Hybrid Parts Out e-TPU and a 50% Water-Based Solution of Polyvinylpyrrolidone-Co Vinylacetate (Vinylacetate Content 40%) with K Value of 30 (Luvitek® VA64W)

200 g of e-TPU 1 and 66.7 g of a 50% weight solution in distilled water of polyvinylpyrrolidone-co vinylacetate (vinylacetate content 40%) (Luvitek® VY64W, K value 30), were mixed by means of a wood spatula at room temperature (1 minute). The wetted E-TPU beads were then places in a wood form (20×100×300 mm), which in advance was coated with a release agent (Indrosil 2000). After evaporation of the water (24 hours at room temperature) the e-TPU grains are bonded together and can be taken out from the form. Thus, a e-TPU hybrid plate was obtained.

Due to the non-toxicity of the components of the hybrids easy and save processing is guaranteed.

Mechanical Testing:

The mechanical properties of plates obtained with the 3D Hybrid plates from example 3 to 10 were measured.

Example 9 was repeated twice and one of the plates was after drying at room temperature heated at 100° C. for 15 minutes. Then, the mechanical tests were performed.

The density of the hybrid E-TPU parts were measured according to DIN EN ISO 845:2009-10.

Tensile strength and elongation at break are measured with a universal testing machine, which is equipped with a 2.5 kN force sensor (class 1 or better (from 10N), DIN EN ISO 7500-1, 2018), a long-stroke-extensometer (class 1, DIN EN ISO 9513, 2013) and pneumatic clamps (6 bar, clamping jaws out of pyramid grid (Zwick T600 R)).

The specimens (150 mm×25.4 mm×thickness of the test plate) are cut from a (200×200×10 mm) test plate (dimensions could vary slightly due to shrinkage) with a cutting die. Before, the test plates were stored for at least 16 h under standardized climate conditions (23±2° C. and 50±5% humidity). The measurement is also carried out in standard climate. For each specimen density is determined. Therefore, mass (precision scale; accuracy: ±0.001 g) and thickness (caliper; accuracy: ±0.01 mm, contact pressure 100 Pa, value is only measured once in the middle of the specimen) are measured. Length (150 mm) and width (25.4 mm) are known from the dimension of the cutting die.

The distance between the clamps (75 mm) and the initial gauge length of the long-stroke-extensometer (50 mm) are checked before starting the measurement. The specimen is placed on the upper clamp and the force is tared. Then the specimen is clamped und measurement is started. The measurement is carried out with a testing speed of 100 mm/min and a preload of 1 N. The calculation of tensile strength $\sigma_{max}$ (specified in MPa) is done by equation (3), which is the maximum tension. This tension can be identical to the tension at breakage. Elongation at break (specified in %) is calculated using equation (4). Three specimens are tested for each material. The mean value from the three measurements is given. If the test specimen tears outside the selected area, this is noted. A repetition with another test specimen is not performed $$\sigma_{max} = \frac{F_{max}}{d \cdot b} \quad (3)$$

$F_{max}$ = Maximum tension [N]

$d$ = Thickness of the specimen [mm]

$b$ = Width of the specimen [mm]

$$\epsilon = \frac{L_B - L_0}{L_0} \cdot 100\% \quad (4)$$

$L_B$ = Gauge length at break [mm]

$L_0$ = Initial Gauge length at break [mm]

| | Exa 3 | Exa 4 | Exa 5 | Exa 6 | Exa 7 | Exa 8 | Exa 9 | Exa 9' | Exa 10 |
|---|---|---|---|---|---|---|---|---|---|
| Test 1 | 0.5 | n.b. | 0.6 | 0.5 | 0.4 | 0.5 | 1.4 | 2.7 | 0.4 |
| Test 2 | 0.08 | 0.03 | 0.08 | 0.07 | 0.05 | 0.05 | 0.11 | 0.24 | 0.05 |
| Test 3 | 35 | 11 | 30 | 31 | 13 | 27 | 56 | 138 | 25 |
| Test 4 | 40 | 15 | 41 | 36 | 29 | 52 | 64 | 160 | 43 |
| Test 5 | 0.147 | 0.138 | 0.136 | 0.135 | 0.129 | 0.124 | 0.142 | 0.140 | 0.114 |

Exa 9' = Example 9 after annealing @ 100° C. for 15 Minutes
Test 1 = Tear growth resistance on E-TPU in N/mm according to DIN EN ISO 8067: 2009-06;
Test 2 = Tensile Strength E-TPU in MPa
Test 3 = Elongation at break in % according to DIN EN ISO 1798: 2008;
Test 4 = Elongation at break (Traverse) in % according to DIN EN ISO 1798: 2008;
Test 5 = Density of 3 D hybrids in g/$cm^3$ according to DIN EN ISO 845: 2009-10

The invention claimed is:

1. A process for preparing a shaped body, the process comprising:

a1) bringing particles of an expanded thermoplastic elastomer into contact with a water-based binder, resulting in at least partly coated particles;

a2) drying the at least partly coated particles; and $b2_1$) after the particles are dried in a2), the particles are brought into the shape of the shaped body and thereafter the particles are contacted with a solvent, or are subjected to heat, or both wherein the particles are contacted with a solvent and are subjected to heat; or $b2_2$) after the particles are dried in a2), the particles are contacted with a solvent, or are subjected to heat, or both wherein the particles are contacted with a solvent and are subjected to heat, and thereafter are brought into the shape of the shaped body.

2. The process of claim 1, wherein the particles are brought into the shape of the shaped body and contacted with a solvent.

3. The process of claim 2, wherein the solvent is a water-based solvent.

4. The process of claim 1, wherein the particles are brought into the shape of the shaped body by subjecting the particles to heat.

5. The process of claim 1, wherein the contacting with a solvent or the subjecting the particles to heat is carried out before the shaping.

6. The process of claim 1, wherein the contacting with a solvent or the subjecting the particles to heat is carried out after the shaping.

7. The process of claim 1, wherein the expanded thermoplastic elastomer is expanded thermoplastic polyurethane.

8. The process of claim 1, wherein the water-based binder is an aqueous polymeric dispersion.

9. The process of claim 8, wherein the particles in the aqueous polymer dispersion have a minimum film formation temperature (according to DIN ISO 2115:2001-04) below 70° C.

10. The process of claim 9, wherein the aqueous polymer dispersion is an aqueous polystyrene acrylic dispersion, an aqueous acrylic dispersion, an aqueous butadiene/styrene dispersion, or an aqueous polyurethane dispersion.

11. The process of claim 1, wherein the water-based binder is an aqueous polymeric solution.

12. The process of claim 11, wherein the aqueous polymeric solution is an aqueous polyvinylpyrrolidone solution.

13. The process of claim 1, wherein the particles of the expanded thermoplastic elastomer are brought into the shape of the shaped body by filling a negative form of the shaped body with the particles.

14. The process of claim 1, wherein the particles of the expanded thermoplastic elastomer are brought into the shape of the shaped body by hand forming the particles.

15. The process of claim 1, wherein at least one of a1), a2), or a1) and a2) are carried out at room temperature.

* * * * *